US010169306B2

(12) United States Patent
O'Shaughnessy et al.

(10) Patent No.: US 10,169,306 B2
(45) Date of Patent: *Jan. 1, 2019

(54) ENHANCED FAVORITES SERVICE FOR WEB BROWSERS AND WEB APPLICATIONS

(71) Applicant: Oath Inc., Dulles, VA (US)

(72) Inventors: Timothy John O'Shaughnessy, Washington, DC (US); Aditya Khosla, Sunnyvale, CA (US); Brock Laporte, San Carlos, CA (US); Alberto Cobas, Scotts Valley, CA (US); Colin Chang, San Jose, CA (US)

(73) Assignee: Oath Inc., Dulles, VA (US)

( * ) Notice: Subject to any disclaimer, the term of this patent is extended or adjusted under 35 U.S.C. 154(b) by 310 days.

This patent is subject to a terminal disclaimer.

(21) Appl. No.: 15/019,122

(22) Filed: Feb. 9, 2016

(65) Prior Publication Data

US 2016/0154773 A1    Jun. 2, 2016

Related U.S. Application Data

(63) Continuation of application No. 11/424,452, filed on Jun. 15, 2006, now Pat. No. 9,268,867, which is a (Continued)

(51) Int. Cl.
*G06F 17/22* (2006.01)
*G06F 17/30* (2006.01)
*H04L 29/08* (2006.01)

(52) U.S. Cl.
CPC ...... *G06F 17/2235* (2013.01); *G06F 17/2247* (2013.01); *G06F 17/30884* (2013.01); *H04L 67/02* (2013.01); *H04L 67/26* (2013.01)

(58) Field of Classification Search
CPC ......... G06F 17/30884; G06F 17/30861; G06F 17/30864; G06F 17/30873;
(Continued)

(56) References Cited

U.S. PATENT DOCUMENTS 5,922,044 A    7/1999  Banthia
6,208,995 B1   3/2001  Himmel et al.
(Continued)

FOREIGN PATENT DOCUMENTS

GB        2352600        1/2001

OTHER PUBLICATIONS

"Categorizing the Web: Bootstrapping Personalized Content Management", Apr. 2001; Rulespace, pp. 1-12.
(Continued)

*Primary Examiner* — Greg C Bengzon
(74) *Attorney, Agent, or Firm* — Bookoff McAndrews, PLLC

(57) ABSTRACT

The invention provides enhancements for the use of favorites during a Web browsing session. A first enhancement identifies when a user is adding a favorite to his favorites list and auto-suggests a category under which the favorite could be stored. A second enhancement allows a user to review his favorites list and see a summary of feed content (RSS or other standard) on each feed enabled page on his favorites list, without requiring the user to link to the page in question. A third enhancement allows the user to view an manipulate the feed in an independent display window.

18 Claims, 12 Drawing Sheets

Related U.S. Application Data continuation-in-part of application No. 11/197,681, filed on Aug. 3, 2005, now Pat. No. 8,739,020.

(58) Field of Classification Search
CPC .......... G06F 17/30893; G06F 17/3089; G06F 3/0484; G06F 3/04842; G06F 3/04845; G06F 3/0486; G06F 17/2235; G06F 17/2247; G06F 17/30896; G06F 3/0481; G06F 3/0482; G06F 8/65; G06F 17/30017; G06F 17/30056; G06F 17/30076; G06F 17/30091; G06F 17/30126; G06F 17/30203; G06F 17/30522; G06F 17/30528; G06F 17/3053; G06F 17/30554; G06F 17/30643; G06F 17/30705; G06F 17/30707; G06F 17/30731; G06F 17/30817; G06F 17/30828; G06F 17/30887; G06F 17/30905; G06F 17/30917; G06F 17/30979; G06F 17/30994; G06F 19/322; G06F 19/325; G06F 19/328; G06F 21/6245; G06F 21/6254; G06F 21/6263; G06F 2203/04802; G06F 3/048; G06F 3/04815; G06F 3/04817; G06F 3/0483; G06F 3/04847; G06F 3/0485; G06F 8/36; G06F 8/38; G06F 8/60; G06F 9/00; G06F 9/30; G06F 9/44; G06F 9/54; H04L 67/02; H04L 67/26; H04L 29/06; H04L 29/12009; H04L 29/12594; H04L 41/22; H04L 61/30; H04L 67/22; H04L 67/42; H04L 12/1822; H04L 2012/5626; H04L 2463/101; H04L 2463/102; H04L 41/5045; H04L 43/0876; H04L 51/12; H04L 51/22; H04L 51/38; H04L 63/061; H04L 63/0823; H04L 63/0853; H04L 63/101; H04L 63/102; H04L 63/20; H04L 67/00; H04L 67/04; H04L 67/06; H04L 67/10; H04L 67/14; H04L 67/142; H04L 67/28; H04L 67/2828; H04L 67/2838; H04L 67/2842; H04L 67/289; H04L 67/306; H04L 67/34; H04L 69/04; H04L 69/08; H04L 69/329; H04M 1/72544

See application file for complete search history.

(56) References Cited

U.S. PATENT DOCUMENTS

| | | | |
|---|---|---|---|
| 6,262,724 B1* | 7/2001 | Crow | G06F 3/048 |
| | | | 715/723 |
| 6,356,908 B1* | 3/2002 | Brown | G06F 17/30899 |
| 6,782,430 B1 | 8/2004 | Cragun | |
| 6,784,900 B1 | 8/2004 | Dobronsky et al. | |
| 6,868,525 B1 | 3/2005 | Szabo | |
| 6,959,339 B1 | 10/2005 | Wu et al. | |
| 6,973,456 B1 | 12/2005 | Elgart | |
| 7,031,961 B2 | 4/2006 | Pitkow et al. | |
| 7,065,520 B2 | 6/2006 | Langford | |
| 7,073,121 B2 | 7/2006 | Brown et al. | |
| 7,080,139 B1 | 7/2006 | Briggs et al. | |
| 7,181,438 B1 | 2/2007 | Szabo | |
| 7,321,918 B2 | 1/2008 | Burd et al. | |
| 7,366,996 B2 | 4/2008 | Hoyle | |
| 7,373,358 B2 | 5/2008 | Ronnewinket et al. | |
| 7,451,152 B2 | 11/2008 | Kraft et al. | |
| 7,596,533 B2 | 9/2009 | Szabo et al. | |
| 9,268,867 B2* | 2/2016 | O'Shaughnessy | |
| | | | G06F 17/30884 |
| 9,407,963 B2* | 8/2016 | DeShan | G06F 17/3082 |
| 2001/0028369 A1* | 10/2001 | Gallo | G06F 3/04815 |
| | | | 715/848 |
| 2002/0069264 A1* | 6/2002 | Pasquali | G06F 17/30873 |
| | | | 709/219 |
| 2003/0020671 A1* | 1/2003 | Santoro | G06F 3/0481 |
| | | | 345/1.3 |
| 2003/0126136 A1* | 7/2003 | Omoigui | G06F 17/3089 |
| 2003/0184582 A1* | 10/2003 | Cohen | G06F 17/30884 |
| | | | 715/736 |
| 2003/0184583 A1 | 10/2003 | Lim | |
| 2003/0210274 A1* | 11/2003 | Subramanian | G06F 3/0481 |
| | | | 715/809 |
| 2003/0212904 A1 | 11/2003 | Randle et al. | |
| 2004/0001081 A1 | 1/2004 | Marsh | |
| 2004/0003118 A1 | 1/2004 | Brown et al. | |
| 2004/0049514 A1 | 3/2004 | Burkov | |
| 2004/0056893 A1* | 3/2004 | Canfield | G06F 3/0486 |
| | | | 715/753 |
| 2004/0189695 A1 | 9/2004 | Kurtz et al. | |
| 2004/0205473 A1* | 10/2004 | Fisher | G06F 21/41 |
| | | | 715/255 |
| 2004/0267779 A1 | 12/2004 | Carter et al. | |
| 2005/0050472 A1 | 3/2005 | Faseler et al. | |
| 2005/0097190 A1* | 5/2005 | Abdelhak | G06F 17/30873 |
| | | | 709/217 |
| 2005/0165615 A1 | 7/2005 | Minar | |
| 2005/0188403 A1 | 8/2005 | Kotzin | |
| 2005/0198056 A1 | 9/2005 | Dumais et al. | |
| 2005/0198125 A1 | 9/2005 | Beck et al. | |
| 2005/0203917 A1 | 9/2005 | Freeberg et al. | |
| 2005/0216825 A1 | 9/2005 | Teague | |
| 2005/0223081 A1* | 10/2005 | McMahan | G06F 17/3089 |
| | | | 709/218 |
| 2005/0234940 A1 | 10/2005 | Apparao et al. | |
| 2005/0257128 A1* | 11/2005 | Pasquali | G06F 17/3089 |
| | | | 715/252 |
| 2005/0283734 A1 | 12/2005 | Santoro et al. | |
| 2005/0289468 A1 | 12/2005 | Kahn et al. | |
| 2006/0073812 A1 | 4/2006 | Punaganti et al. | |
| 2006/0095507 A1 | 5/2006 | Watson | |
| 2006/0158459 A1* | 7/2006 | Ferguson | G06F 9/451 |
| | | | 345/619 |
| 2006/0167860 A1 | 7/2006 | Eliashberg et al. | |
| 2006/0173985 A1 | 8/2006 | Moore | |
| 2006/0230021 A1 | 10/2006 | Diab et al. | |
| 2006/0242554 A1 | 10/2006 | Gerace et al. | |
| 2006/0259462 A1 | 11/2006 | Timmons | |
| 2006/0265394 A1 | 11/2006 | Raman et al. | |
| 2006/0265396 A1 | 11/2006 | Raman et al. | |
| 2006/0277167 A1* | 12/2006 | Gross | G06F 17/30864 |
| 2006/0288011 A1 | 12/2006 | Ghandi et al. | |
| 2007/0006094 A1* | 1/2007 | Canfield | G06F 3/0486 |
| | | | 715/781 |
| 2007/0011665 A1 | 1/2007 | Ghandi et al. | |
| 2007/0016609 A1 | 1/2007 | Kim et al. | |
| 2007/0022419 A1 | 1/2007 | Subbarao et al. | |
| 2007/0033517 A1* | 2/2007 | O'Shaughnessy | |
| | | | G06F 17/30884 |
| | | | 715/205 |
| 2007/0038610 A1* | 2/2007 | Omoigui | G06F 17/3089 |
| 2007/0050446 A1 | 3/2007 | Moore | |
| 2007/0050734 A1 | 3/2007 | Busey | |
| 2007/0083520 A1 | 4/2007 | Shellen et al. | |
| 2007/0094389 A1 | 4/2007 | Nussey et al. | |
| 2007/0174774 A1* | 7/2007 | Lerman | G06F 17/30017 |
| | | | 715/723 |
| 2007/0198943 A1 | 8/2007 | Grason et al. | |
| 2008/0040675 A1* | 2/2008 | Canfield | G06F 3/0481 |
| | | | 715/752 |
| 2008/0046506 A1* | 2/2008 | Broda | G06F 9/4443 |
| | | | 709/203 |
| 2009/0013266 A1 | 1/2009 | Ghandi et al. | |

(56) References Cited

U.S. PATENT DOCUMENTS

| | | | | |
|---|---|---|---|---|
| 2009/0132942 A1* | 5/2009 | Santoro | ............... | G06F 3/0481 |
| | | | | 715/765 |
| 2011/0035685 A1* | 2/2011 | Johanson | ............... | H04N 7/15 |
| | | | | 715/753 |
| 2014/0281850 A1* | 9/2014 | Prakash | ............... | G06F 17/218 |
| | | | | 715/202 |

OTHER PUBLICATIONS

"Using AvantGo Mobile Inspection 2.0", copyright 2002, Downloaded on Dec. 15, 2005, 16 pages.

"AvantGo User Guides", copyright 1998-2005, Downloaded on Dec. 15, 20015, 1 page, retrieved from wetsite: http://www.avantgo.com/doc/ami.html.

"Database Reference Guide for AvantGo Mobile Inspection 2.0", copyright 2002, Downloaded on Dec. 15, 2005; 42 pages, retrieved from website: http://www.avantgo.com/doc/mobile/palm/index.html.

"Inspector Training Setup Guide", copyright 2002, Downloaded on Dec. 15, 2005, 46 pages.

"Installation and Setup Guide for AvantGo Mobile Inspection Version 2.0", copyright 2002, Downloaded on Dec. 15, 2005, 46 pages.

"AvantGo version 3.x Palm User Guide", Downloaded Dec. 15, 2005, 91 pages from website: http://www.avantgo.com/doc/mobile/palm.

"AvantGo version 3.x Pocket PC User Guide", Downloaded Dec. 15, 2005, 79 pages, retrieved from website: http://www.avantgo.com/doc/mobile/ppc.

"AvantGo Version 5.7+ Palm User Guide", copyright 1998-2004, Modified Nov. 10, 2003, Downloaded on Dec. 15, 2005, 60 pages, retrieved from website: http://www.avantgo.net/demos/tutorial/overview.php?device=palm.

"AvantGo Version 5.7+Pocket PC User Guide", copyright 1998-2004, Modified Nov. 10, 2003, Downloaded on Dec. 15, 2005, 64 pages, retrieved from website: http://www.avantgo.net/demos/tutorial/overview.php?device=ppc.

"mobilerss.net", retrieved from website: http://www.mobilerss.net, retrieved on Oct. 25, 2005, 2 pages.

"movilerss.net, about", retrieved from website: http://www.mobilerss.net/about.php, retrieved on Dec. 15, 2005, 1 page.

"TwoPeaks Releases Free MobileRSS Beta", posted Aug. 2003, copyright 2004, retrieved on Oct. 25, 2005 from website: http://www.pocketpcthoughts.com/forums/viewtopic.phop?p=156370, 5 pages.

"Introduction to RSS", created on Mar. 27, 2000, revised on Apr. 14, 2003, downloaded on Oct. 25, 2005 from website: http://www.webreference.com/authoring/languages/sml/rss/intro, 3 pages.

"RSS Synidication and Aggregation", created on Mar. 27, 2000, revised on May 7, 2001, copyright 2005, Downloaded on Oct. 25, 2005 from website: http://www.webreference.com/authoring/languages/xml/rss/intro/2.html, 3 pages.

"WebRef and the Future of RSS" created on Mar. 27, 2000, revised on Mar. 27, 2000, copyright 2005, downloaded on Oct. 15, 2005, 3 pages; retrieved from website: http://www/webreference.com/authoring/languages/xml/rss/intro/3.html.

"RSS", copyright 2005, downloaded on Oct. 26, 2005 from website: http://www.webopedia.com/TERM/R/RSS.html, 3 pages.

"RDF", copyright 2005, downloaded on Oct. 26, 2005 from website: http://www.webopedia.com/TERM/R/RDF.html, 2 pages.

"What is RSS?", copyright 1998-2005, downloaded on Oct. 26, 2005 from website: http://www.xml.com/lpt/a/2002/12/18/dive-into-xml.html, 8 pages.

Java.net, "Rome v0.4 Tutorial Using Rome to Convert a syndication feed from one type to another" URL:java.net/bin/view/Javawsxml/Rome04TutorialFeedConverter, Oct. 13, 2005 (via Wayback Machine:archive.org/web/20051013055524/wiki.java.net/bin/view/Javawsxml/Rome04TutorialFeedConverter).

Java.net, "The Source for Java Technology Collaboration", rome, retrieved on Jan. 17, 2006 from website: http://rome.dev.java.net.

Home page for Syndic8.com, copyright 2001-2004, retrieved on Jan. 4, 2007 from website: http://web.archive.org/web/20041112060816/http://www/syndic8.com.

A better PDAnews aggregator by Marc, Jan. 2004, retrieved on Jan. 4, 2007, http://blogs.officezealot.com/marc/archive/2004/01/03/2156.aspx.

Internet Archive, Frequently Asked Questions: http://www.archive.org/about/faqs.php, Dec. 6, 2006, 46 pages.

* cited by examiner

FIG. 8

ENHANCED FAVORITES SERVICE FOR WEB BROWSERS AND WEB APPLICATIONS

CROSS REFERENCE TO RELATED APPLICATION

This application is a continuation of U.S. patent application Ser. No. 11/424,452, filed on Jun. 15, 2006, now U.S. Pat. No. 9,268,867, which is a continuation-in-part of U.S. patent application Ser. No. 11/197,681, filed on Aug. 3, 2005, now U.S. Pat. No. 8,739,020. The above applications are expressly incorporated herein by reference to their entireties.

BACKGROUND OF THE INVENTION

Technical Field

The invention relates to management and viewing of "favorites" or "bookmarks". More particularly, the invention relates to an enhanced favorites service built in to a Web browser as well as available from a web site, accessible from any web browser.

Description of the Prior Art

Web browsing has evolved into a sophisticated information management process. Web browsing sessions produce much information that the user may wish to access at a later time. Currently, users save Web pages of interest as "favorites". Each favorite is manually cached by the user in one of several subject matter relevant folders. This process is both inefficient and inexact. The user must make a decision based on imperfect information, i.e. the user may not have fully reviewed the content of the page that is being added to his favorites list, and thus places the page in the wrong category. The later retrieval of such favorite information may be hampered by such wrong categorization.

Further, many such favorites have feeds (conforming to RSS or other standards) associated with them. RSS (Really Simple Syndication) is a format for syndicating news and the content of news-like sites, including major news sites such as Wired, CNN and ESPN news-oriented community sites such as Slashdot, and personal web logs. Once information about each item is in RSS format, an RSS-aware program can check the feed for changes and react to the changes in an appropriate way (see http://www.xml.com/pub/a/2002/12/18/dive-into-xml.html). Currently, Web pages having associated RSS feeds provide a list of RSS items when the page is linked-to. Modern browsers, such as FIREFOX (MOZILLA CORP., MOUNTAIN VIEW Calif.) OR INTERNET EXPLORER (MICROSOFT CORP., REDMON Wash.) provide an icon that indicates that such pages contain RSS content. Such browsers also indicate the presence of new RSS content in a favorites list with an indicator, such as an icon or numeric indication. Unfortunately, there is no way for a user to review a favorites list and determine if any of the information on the linked page is of interest, except to follow the link to the page in question and review the information at the page itself. Because much of the RSS information is duplicated over many Websites, a user invariably wastes time reviewing information he has already seen.

SUMMARY OF THE INVENTION

The invention provides a series of enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other feed format) automatically displayed in-line with each feed enabled web site in his favorites list, without requiring him to explicitly to link to the feed URL in question. A third enhancement allows the user to tear off a feed listing from the favorites menu and view it in a separate, persistent display window that has its own characteristics distinct from the browser application Accordingly, the invention provides a mechanism that allows a user to review RSS content without having to link to the page which provides such content. The invention also provides the user the capability of accessing a feed listing from the user's favorites list and viewing the feed listing in a display window separate from the browser. The invention also provides an automatic and consistent approach to organizing favorites.

BRIEF DESCRIPTION OF THE DRAWINGS

FIG. 8 is a screen shot showing an RSS listing torn off from the favorites menu as a separate window;

DETAILED DESCRIPTION OF THE INVENTION

Figure 1:
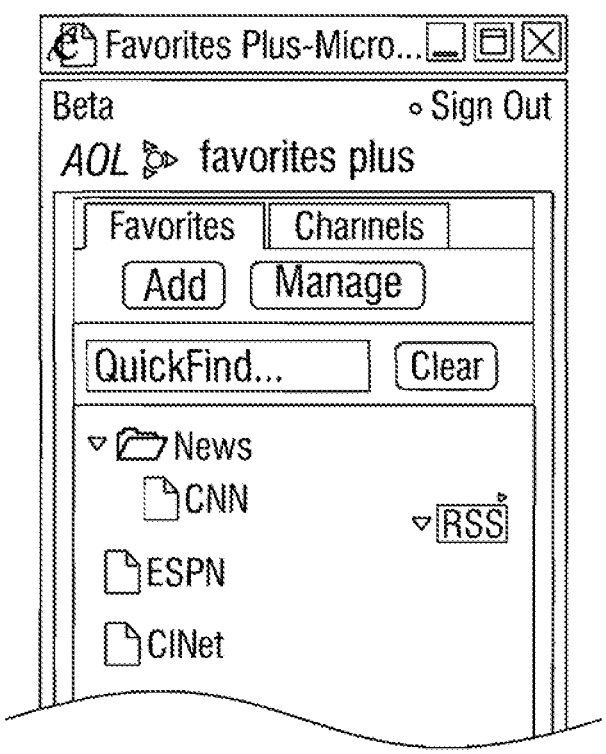
FIG. 1 is a screen shot showing RSS integration in a collapsed view.

The invention provides a series of enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other format) automatically displayed in-line with each feed enabled web site in his favorites list, without requiring him to explicitly to link to the feed URL in question. A third enhancement allows the user to access a feed listing from his favorites list and tear off the listing to display the listing in a persistent display window separate from the browser.

In the presently preferred embodiment, when a user is engaged in a Web browsing session with a browser such as Safari or Firefox, the user may bookmark a Web page of interest for later retrieval and review. The bookmark, also referred to as a favorite, is sent to a host for storage and also sent to a metadata server, The metadata server performs a lookup of the URL and/or other information associated with the bookmarked page for category information and/or for RSS information. The browser, La the user client, can also retrieve relevant information from the Web page. The metadata server makes associations and returns these to the user.

In the case of an RSS feed associated with a bookmarked page, the application (web browser or web application) shows an icon relative to the bookmark. Clicking on the icon retrieves the most recent "headlines" for the feed. The client application periodically checks for new headlines. When the user selects a list of bookmarks, each bookmark in the list that has an associated RSS feed, displays the headlines corresponding to the most recent headlines for the in-line with the bookmark list. In the presently preferred embodiment, the five most recent headlines are shown for each RSS enabled Web page in the list. The actual number of headlines, amount of text presented, and update frequency may be set to default values or they may be set by the user in a preference pane. Additionally, a refresh button may be provided.

In the case of displaying a feed listing in a separate window, the user accesses the RSS feed from the favorites list in the manner previously described. The user can then "tear off" the feed listing from the favorites list, for example by clicking and dragging the listing with a pointing device such as a mouse, and create a new display window separate from the browser, wherein the feed listing is displayed in the new window. The new window exhibits its own behavior. Thus, it is persistent, and the user can interact with the display window independently of the browser.

In the case of automatically organizing bookmarks as they are acquired, The URL and/or other relevant information of a page being bookmarked is referenced by the metadata server to a hierarchical classification scheme, such as that of the Open Directory Project (http://www.dmoz.org). A folder suggestion is returned to the user that identifies a most likely folder for saving the bookmark. The user may select the suggested folder, or he may save the bookmark in any other folder, or create a new folder.

Feed Integration

FUNCTIONS: When a new favorite is added, part of the process in the background is finding an associated feed (RSS/Atom or other format). If a feed can be found (with associated headlines), a feeds icon, shown in FIG. 1 as "RSS", is displayed to the right of the favorite. In one embodiment, the feeds icon is configurable. Thus, it does not always have to denote an RSS feed. Other feed formats, such as RDF (resource description framework) and Atom (IETF ATOMPUB WORKING GROUP) are compatible with the invention. Additionally, another tree control appears next to the favorite icon. Finally, an additional feature is to display a feeds/new feeds differentiation integrated in the folder icon, in case all folders are closed when new feeds are fetched. This applies to all parent folders of URLs having feeds. The new feed status shows if there are one or more new feeds contained anywhere in the folder or enclosed folders.

INTERACTION: Clicking on the title of the favorite takes the user to the favorite place, However, clicking on the "RSS" icon on the right, or expanding the new tree control accesses additional features.

Figure 2:
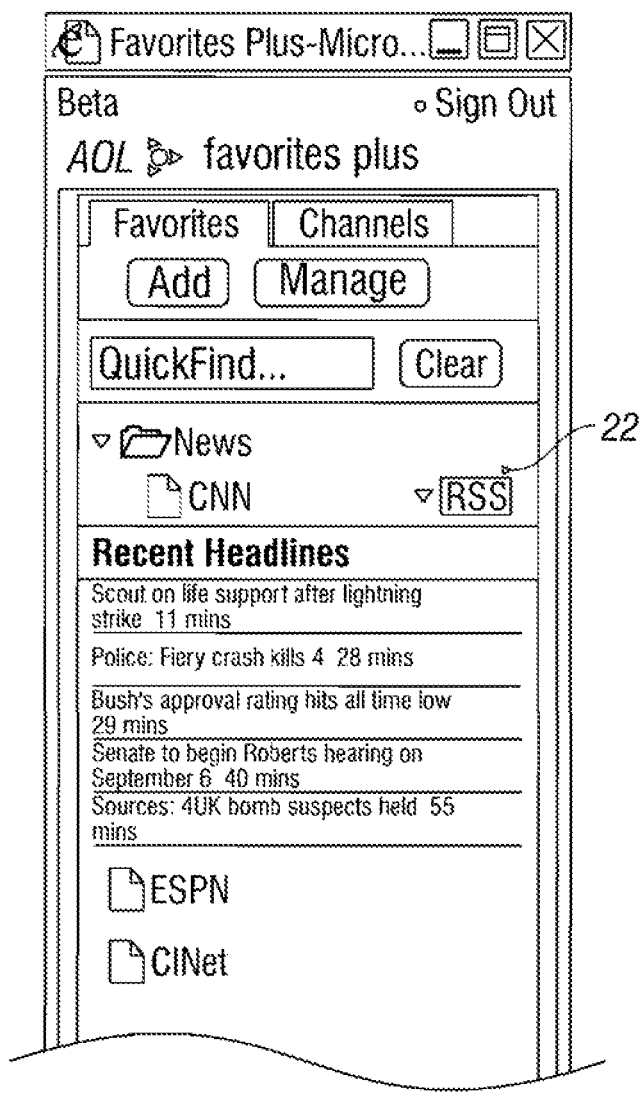
FIG. 2 is a screen shot showing RSS integration in an expanded view.

FIG. 2 shows RSS integration in an expanded view according to the invention. Once the tree control for the favorite is expanded, it displays the top five headlines, ordered by descending date, of the associated feed. Because screen space is at a premium, the preferred embodiment only displays the first few characters of the headline, and truncates it after that. Clicking on any of the headlines takes the browser to the link associated in the feed. Note that an icon 22, i.e. a "sun", indicates that new articles are present.

Those skilled in the art will appreciate that any number of headlines may be displayed and that such headlines may be displayed in any order. Additionally, a user preference dialog may be provided to allow the user to select such parameters as number of headlines displayed, order of display, and number of characters to display, for example.

Figure 3:
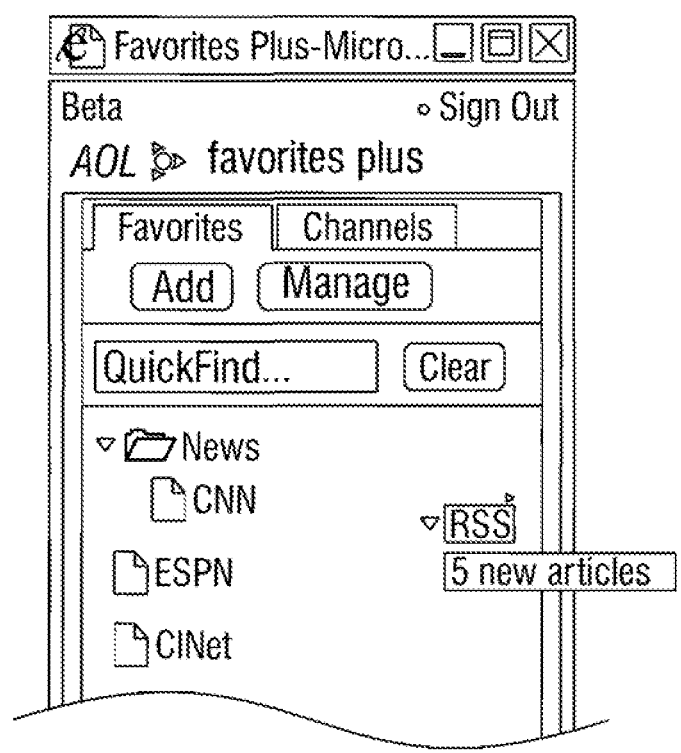
FIG. 3 is a screen shot showing an RSS hover state.

FIG. 3 is a screen shot showing an RSS hover state. To give the user some notification that a feed has been updated, the icon showing that a favorite has a feed preferably has two states: the default state and an updated state, which is shown if a feed has been updated in the last hour in this example. Note that for accessibility reasons, contrast should be more important than color as a change indicator for this icon. Hovering over the "new feeds" icon shows the number of new feeds. No hover state is provided for normal state "RSS" icon, i.e. there are no new feeds. Additionally, as shown in FIG. 3, upon mouse hover, an object becomes draggable.

Tear Off Feed Listing

Figure 4:
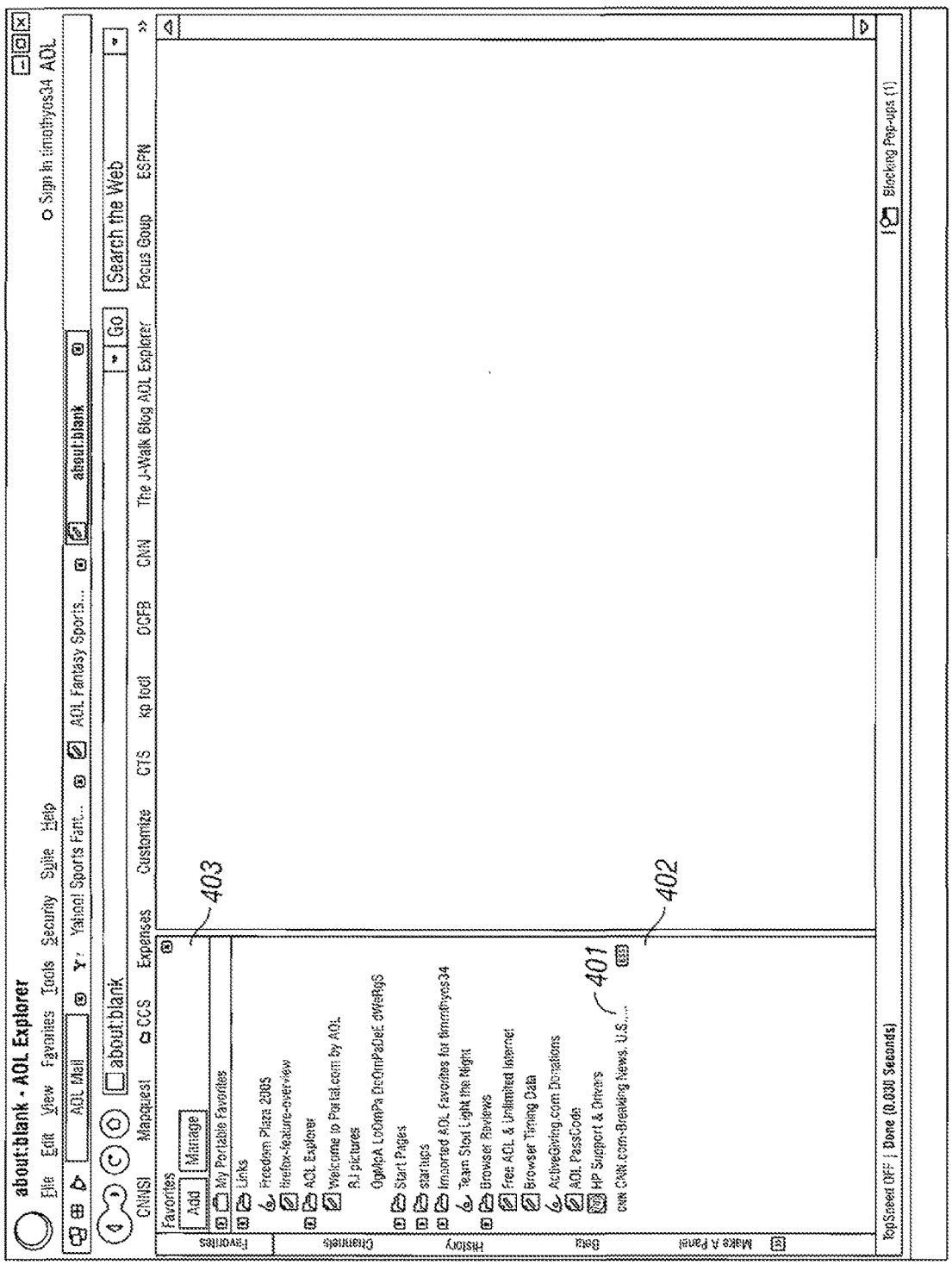
FIG. 4 is a screen shot of a favorites menu having an integrated RSS feed in a collapsed view according to the invention.
Figure 5:
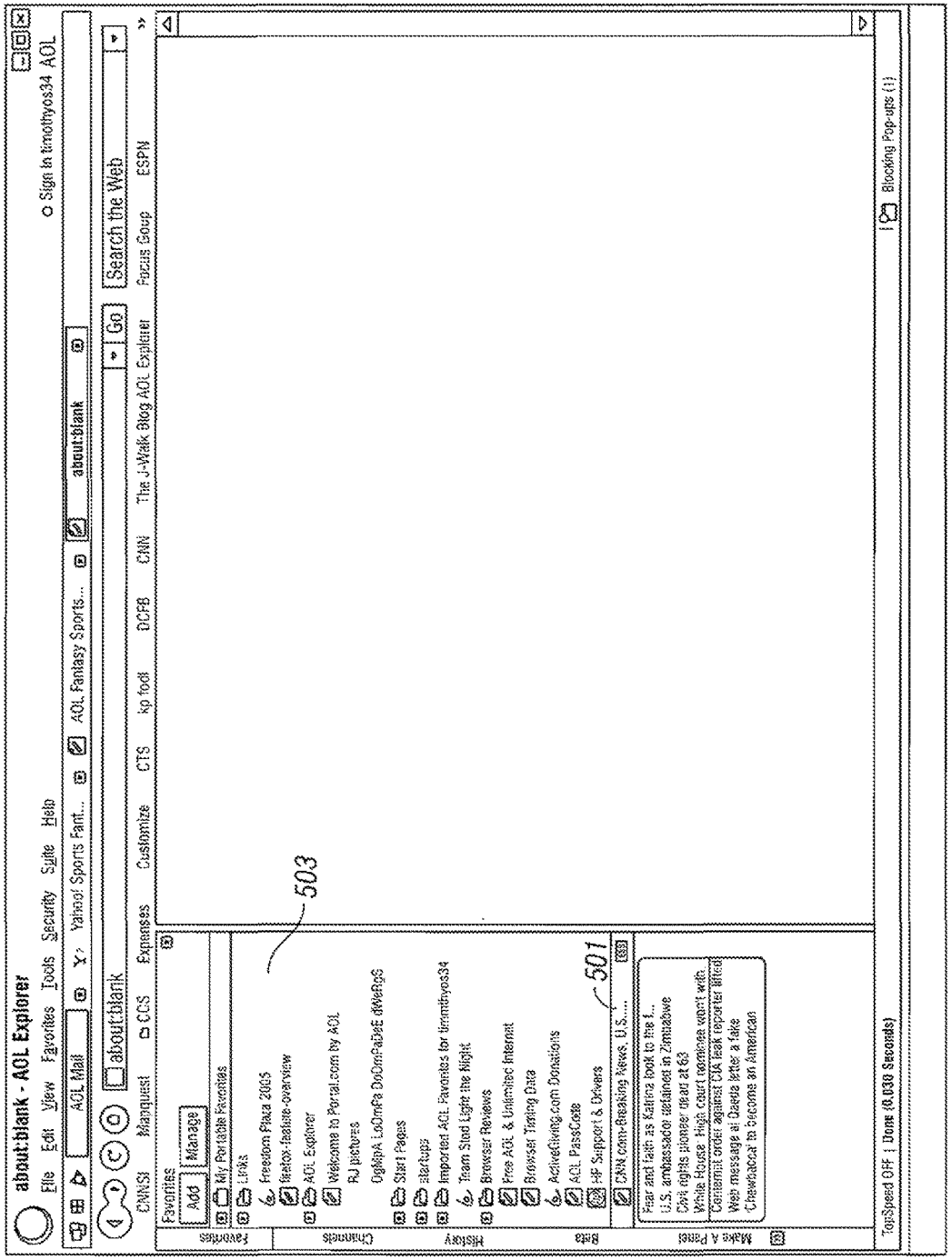
FIG. 5 is a screen shot of a favorites menu having an integrated RSS listing in an expanded view.

The foregoing discussion contains a detailed description of integrating a feed into a favorites list. FIG. 4 is a screen shot of a browser window wherein the user has integrated a feed 401 designated by an icon 402 into the user's favorites list 403. The current view shows the tree control in its collapsed state. FIG. 5 shows a browser window 500, wherein a feed 501 is integrated into the favorites list 503. FIG. 5 shows the tree control in an expanded configuration displaying the most recent headlines for the feed.

Figure 6:
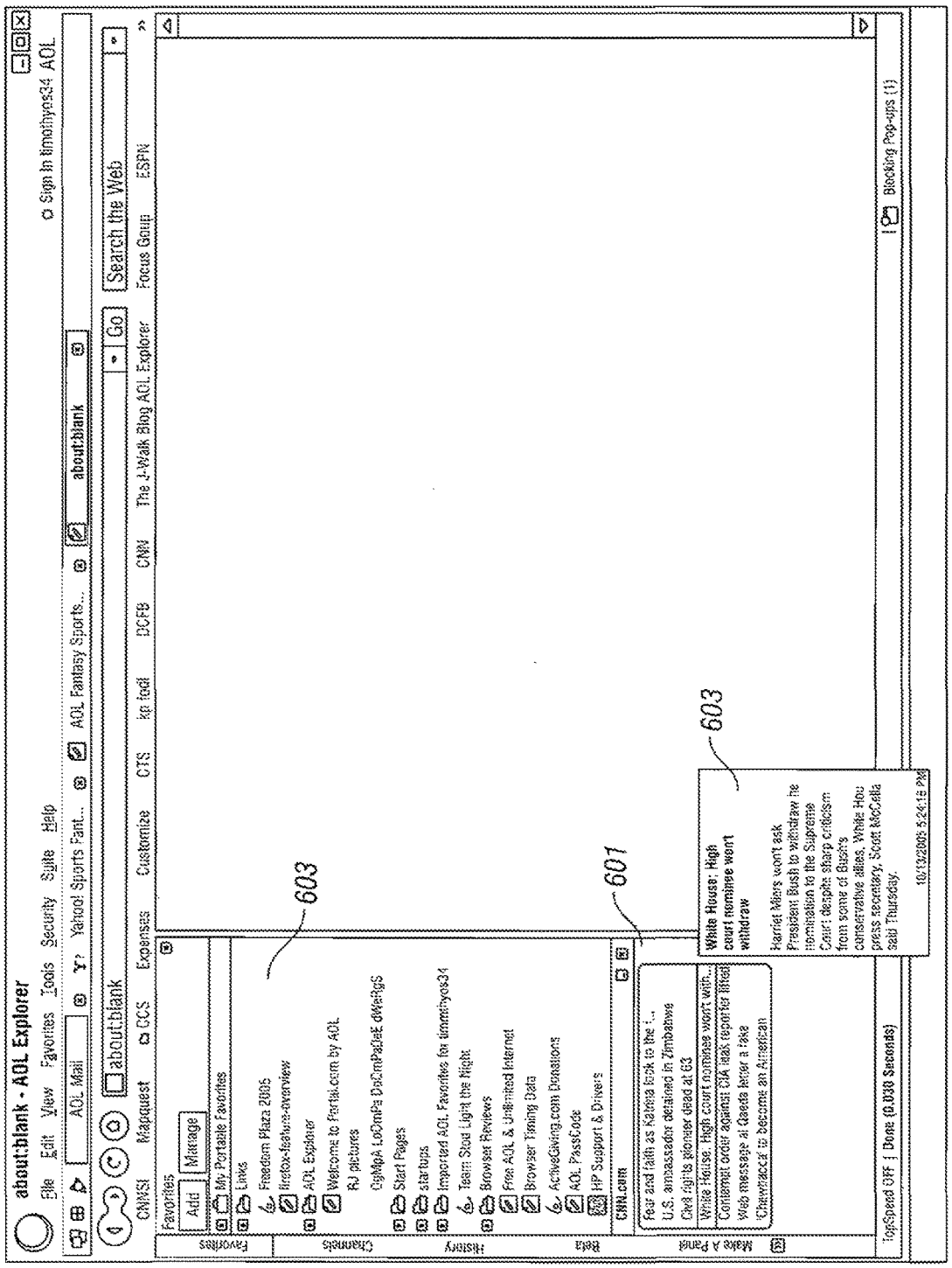
FIG. 6 is a screen shot of a favorites menu with a headline from an integrated RSS feed highlighted.

Having exposed the most recent headlines associated with the feed, the user, by clicking on the headline can view the content associated with the headline. FIG. 6 shows a browser window 600 having a feed 601 integrated into a favorites list 603. The feed is shown with the tree control in the expanded configuration, displaying the most recent headlines to the user. By inititiating an action, for example clicking a headline with a pointing device such as a mouse, the user causes a display window 602 to open containing the content associated with the feed 601. In the present embodiment, the window 602 is a child window, and is therefore not persistent. However, the ordinarily-skilled practitioner will appreciate that the window could easily be persistent. An additional embodiment of the invention allows a user to post commentary on the content of the feed in a separate window.

Figure 7:
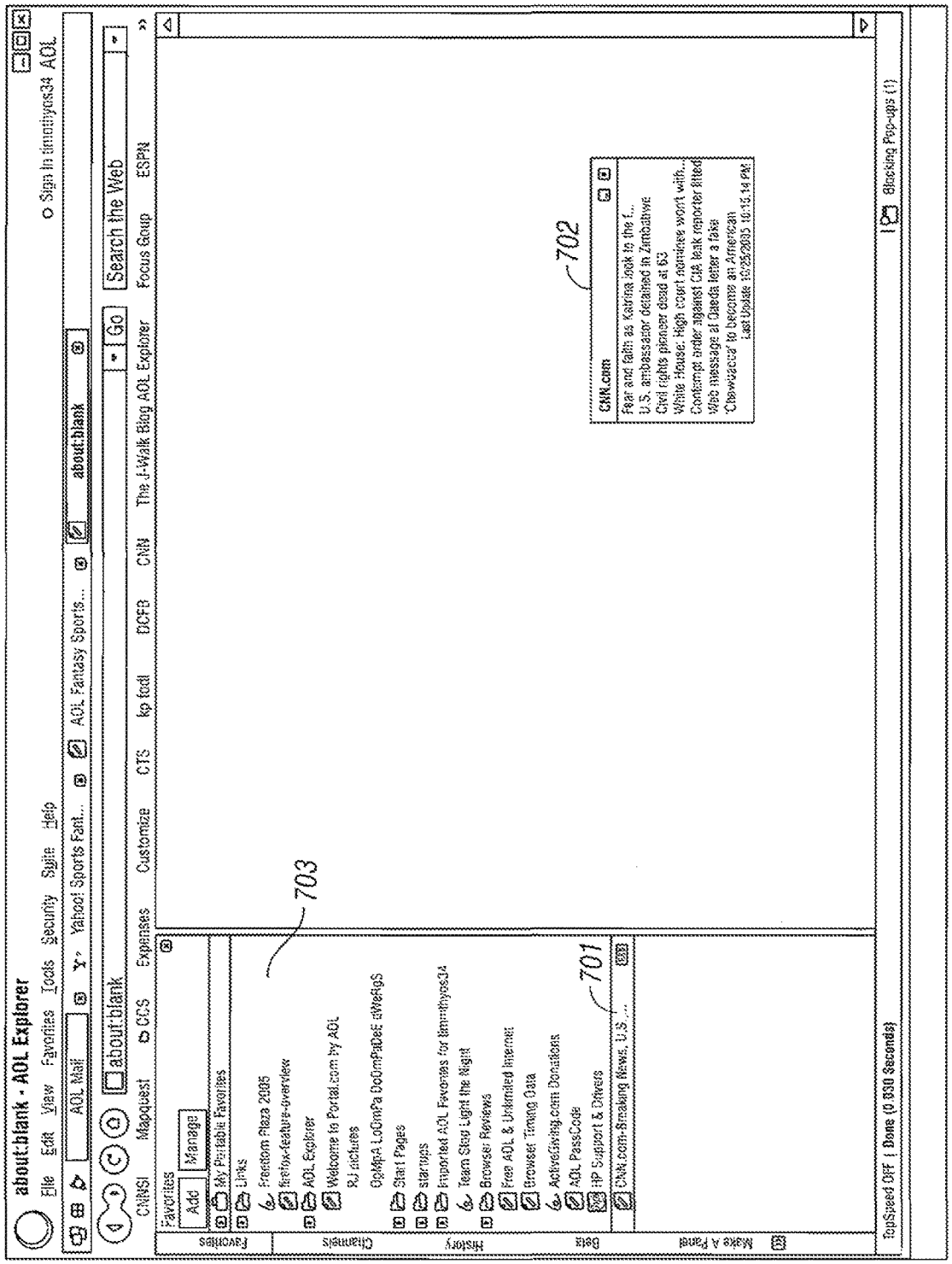
FIG. 7 is a screen shot of a window activated by selecting a headline, as in FIG. 6.
Figure 8:
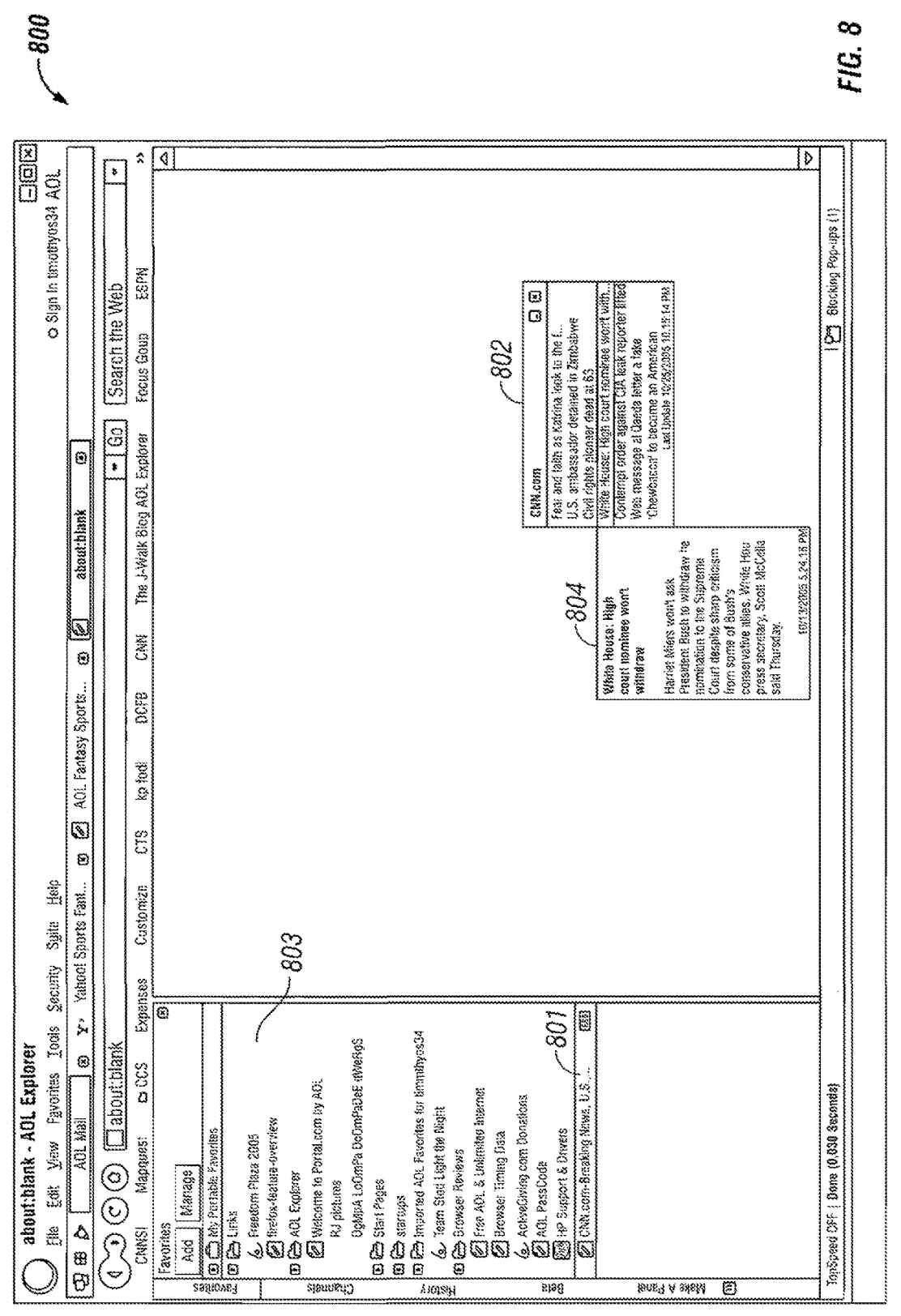

FIG. 7 shows a browser window 800, wherein the user has performed an action that has the effect of "tearing off a feed 701 and displaying the feed in separate display window 702 that is completely independent of the favorites list 703. Because of its existence independent of the browser window, the display window 702 has a number of characteristics; among these: (1) it is persistent. Thus, even if the browser window 700 were to close, the display window 702 would remain open on the user's desktop. (2) The display window has its own characteristics. FIG. 8 shows a browser window 800 having a favorites list 803 with an integrated feed 801. The user has perfomed an action to "tear off" the feed, thereby creating an independent display window 802 displaying the most recent headlines for the feed As with the feed integrated with the favorites list, the user can display the content associated with a headline in a child window 804. Additionally, the independent display window 802 refreshes itself with updated feed information.

Figure 9:
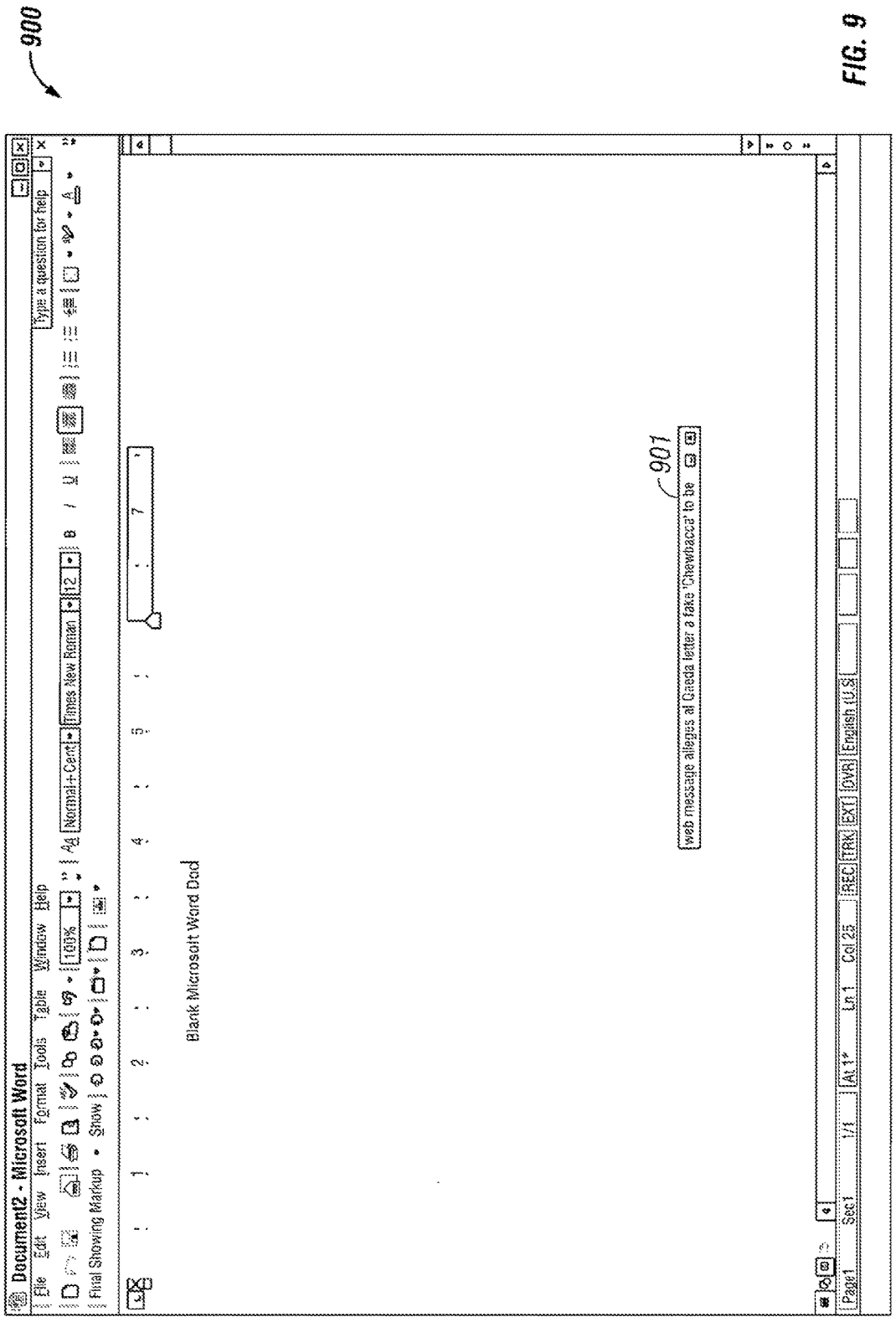
FIG. 9 is a screen shot showing the RSS listing from a favorites menu displayed as a single line ticker that exists in a persistent state on top of other applications.

Because the tear-off display window is an independent object, it can be manipulated in various ways. For example, FIG. 9 shows a word processing document 900, wherein a feed 901 is configured to be displayed as a single-line ticker 901, a persistent object configured to display on top of other applications. The ordinarily-skilled practitioner will be inspired to develop other ways in which the independent nature of the display window can be exploited. All are within the scope of the invention.

Add Favorite

Figure 10:
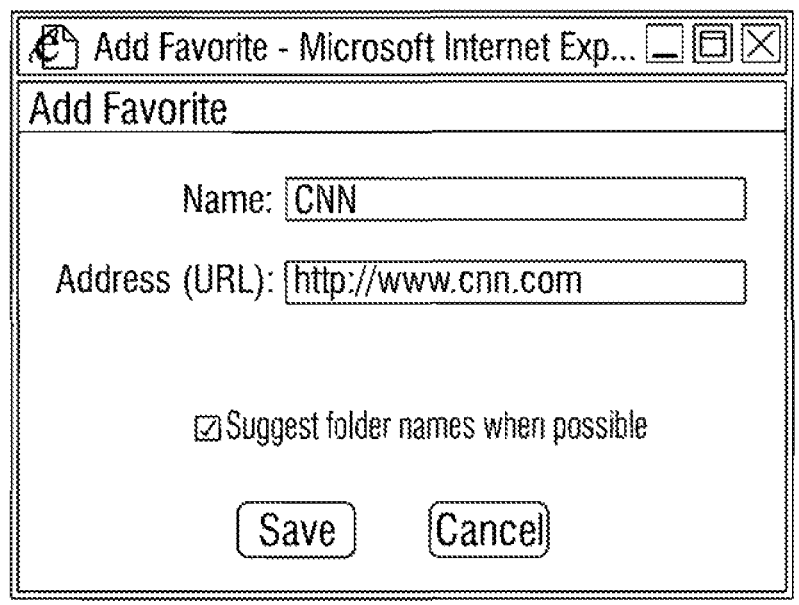
FIG. 10 shows an "add favorite" form.

ADD FAVORITE WINDOW: FIG. 10 shows an Add Favorite form according to the invention, When the user clicks the "Add" button, or selects "Add Favorite . . . " from the favorites menu, the Add Favorite flow begins, ADD FAVORITE FORM FUNCTIONS: The user first selects one of the radio button options. "Select a Folder" is the default option. If the user has the "Suggest folder names" feature turned on, there is an initial delay with progress feedback while the browser retrieves that information. During this time, the folder pull-down menu is disabled, and an animated loading label is displayed. Also, note that the "save" button is disabled during this interaction. In the case that the user has turned off the folder suggestion, all of this goes away, and a folder pull-down menu is provided. If this option is turned off, such state is stored in the user preferences. Completion of the Add Favorite flow results in the display of an updated panel showing the favorite at the bottom of either the root of the list, or the bottom of the items inside a folder if a folder was selected prior to adding.

Folder Suggestion

Figure 11:
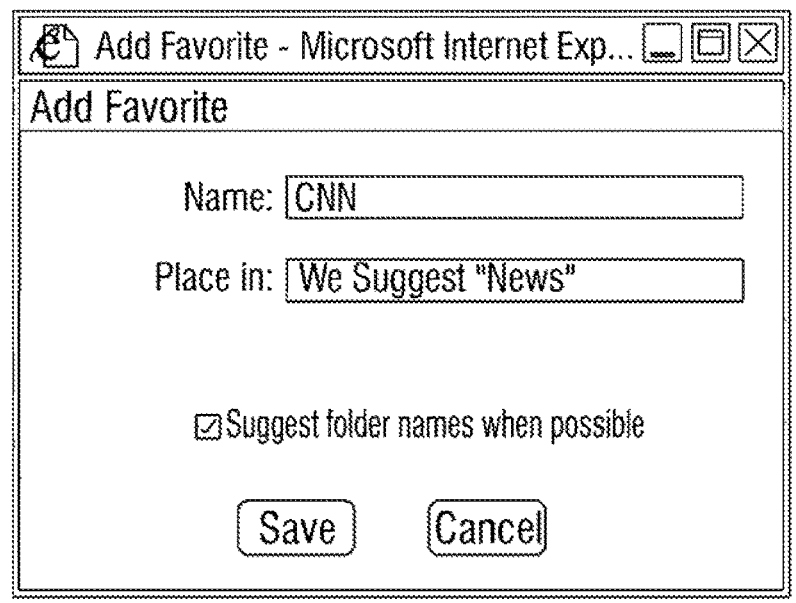
FIG. 11 is a screen shot showing folder suggestions.

FOLDER SUGGESTION: FIG. 11 is a screen shot showing folder suggestions according to the invention. In the event that a suggested folder is found for the new favorite, the pull-down defaults to that folder. FIG. 5 shows the folder with the name bold-faced, and a special icon to denote that it is a suggested folder.

Figure 12:
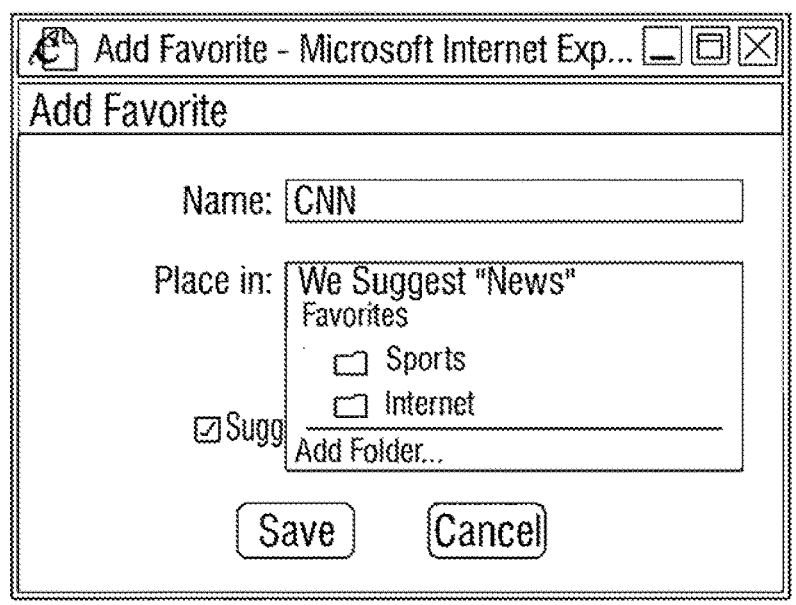
FIG. 12 is a screen shot showing a folder pull-down menu.

FOLDER PULL-DOWN MENU. FIG. 12 is a screen shot showing a folder pull-down menu according to the invention. The folder's pull-down menu is straightforward. Preferably, the menu shows folder icons, and uses indentation to represent hierarchy.

Architecture

Figure 13:
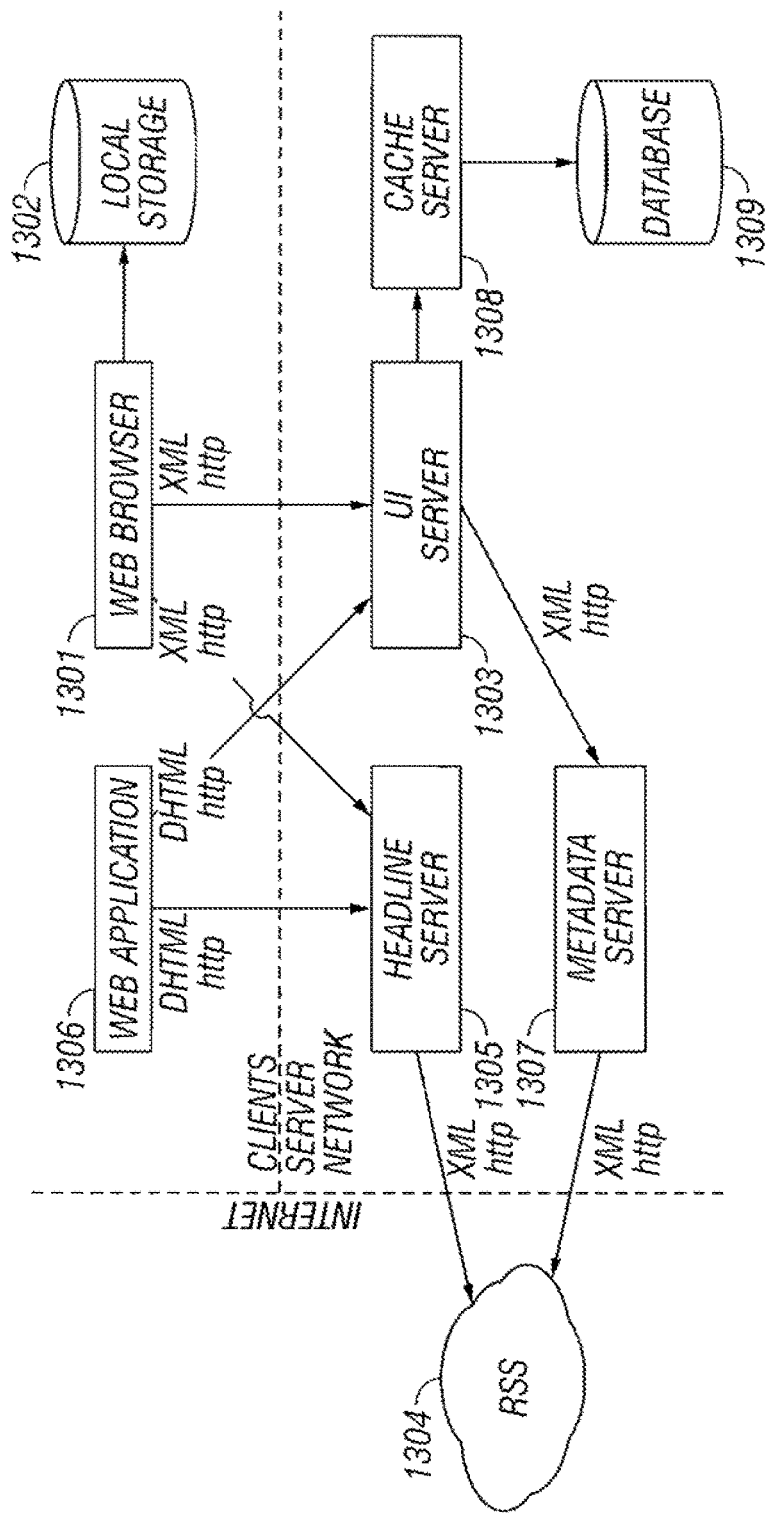
FIG. 13 is a block schematic diagram showing a preferred enhanced favorites system architecture.

FIG. 13 is a block schematic diagram showing a preferred enhanced favorites system architecture. The following is a discussion of each of the items shown in FIG. 13, WEB BROWSER: The web browser 1301 stores the user& favorites, locally via a local storage service 1302 and updates them as needed from the host.

Some information about the network connections:
  a. The web browser gets and sets favorites information by issuing XML over HTTP commands to the UI server 1303. On startup, the web browser issues a get request with the current version it has. If the version cached in the local store is older, the full set of favorites is downloaded from the UI server.
  b. When a user adds a URL to his list of favorites, the web browser issues a request to the UI server to retrieve the associated feed URL and suggested folder name. When the user chooses a folder, the web browser then sends the URL, feed URL, title, and folder name to the host (server) for permanent storage.
  c. When displaying favorites to the user, the web browser may fetch RSS feed 1304 associated with favorites via the Headline server 1305, taking advantage of the caching the latter performs.

WEB APPLICATION: The Web application 1306 is the UI vehicle for "enhanced favorites" outside of the web browser when the user uses any other web browser. It connects to the UI server via HTTP, and receives from it DHTML content. It receives RSS feed content when requested from the Headline server.

UI SERVER: The UI server is both a data aggregator and a presentation layer for clients.

Some information about the UI Server network connections:
  a. Serves up UI and favorites metadata as DHTML to Web browsers. Receives requests from browsers to retrieve as well as to make changes to favorites using HTTP.
  b. Serves up Favorite data and performs add/delete/modify operations for web browsers using XML over HTTP.
  c. Serves up metadata to web browsers using XML over HTTP. To get the folder suggestion and feeds for favorites submitted it issues requests to the metadata server 1307. This server analyzes the favorite URL and matches it with its internal database to come up with associated feeds and a taxonomy path. It then uses mapping rules to transform the taxonomy path into a folder suggestion. It then returns the feeds and suggested folders, which is what the client is interested in.
  d. For authentication, the preferred UI server relies on the AOL standard authentication infrastructure.

HEADLINE SERVER: The headline server serves RSS feed content (headlines and article summaries) to Web browsers or AOL Explorer clients upon request via HTTP. It isolates the web browsers from different RSS protocols. by normalizing feeds to one particular RSS format. Additionally, the server provides two interfaces, XML and DHTML, which allow simple access to feeds and headlines from almost any development platform. The headline server also allows for improved client performance by caching popular feeds and headlines and by using an HTTP connection pool to retrieve feeds from their source.

ENHANCED FAVORITES CACHE COMPLEX: This element 1308 caches user's favorites to reduce the load on the databases and offer a better experience for web users. The system handles requests from the UI server to acid/delete/modify users' data and stores it in the DB 1309 for persistence.

URL METADATA SERVER: This service can accept a request containing a URL or a set of URLs and return data about that URL or set of URLs. The kinds of data that can be returned include folder suggestions and associated feeds. Incoming query requests come from the UI server in the form of XML over HTTP.

DATABASE: The database stores the users' favorites and associated information. The data is accessed by the Cache Complex.

RSS: This represents HTTP servers that can provide RSS and Atom feeds. These feeds might be offered by a service such as AOL or by other feed providers.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for providing persistent access to a data feed listing in a web page, the method comprising the following operations performed by at least one processor:
 displaying, on a user device, a window of a web browser;
 displaying, in the window of the web browser, a list linking to one or more feed-enabled pages;

receiving, via the user device, input specifying a user operation associated with at least one of the one or more feed enabled pages;

providing, to at least one server, data associated with the user operation;

caching, by the at least one server, the data associated with the user operation;

analyzing, by the at least one server, the data associated with the user operation for URL information;

matching, by the at least one server, the URL information with taxonomy path data in a database; and in response to the user operation associated with at least one of the one or more feed-enabled pages, displaying a tearoff object configured to automatically provide updated feed information in a persistent window separate from the window of the web browser.

2. The computer-implemented method of claim 1, wherein the user operation associated with at least one of the one or more feed-enabled pages is a dragging of a representation of the at least one of the one or more feed enabled pages.

3. The computer-implemented method of claim 1 further comprising:

embedding the tearoff object in a document distinct from the web page.

4. The computer-implemented method of claim 1 further comprising:

displaying the tearoff object in the form of a ticker-style display.

5. The computer-implemented method of claim 1 wherein the at least one server isolates the web browser from RSS protocols.

6. The computer-implemented method of claim 1 wherein the tearoff object has characteristics independent of the web browser.

7. An apparatus for providing persistent access to a data feed listing in a web page comprising:

a memory that stores instructions one or more processors that, when executing the instructions, are configured to:

display, on a user device, a window of a web browser;

display, in the window of the web browser, a list linking to one or more feed-enabled pages;

receive, via the user device, input specifying a user operation associated with at least one of the one or more feed-enabled pages;

provide, to at least one server, data associated with the user operation;

cache, by the at least one server, the data associated with the user operation;

analyze, by the at least one server, the data associated with the user operation for URL information;

match, by the least one server, the URL information with taxonomy path data in a database; and in response to the user operation associated with at least one of the one or more feed-enabled pages, display a tearoff object configured to automatically provide updated feed information in a persistent window separate from the window of the web browser.

8. The apparatus of claim 7 wherein the user operation associated with at least one of the one or more feed-enabled pages is a dragging of a representation of the at least one of the one or more feed enabled pages.

9. The apparatus of claim 7 wherein the one or more processors are further configured to:

embed the tearoff object in a document distinct from the web page.

10. The apparatus of claim 7 wherein the one or more processors are further configured to:

display the tearoff object in the form of a ticker-style display.

11. The apparatus of claim 7 wherein the at least one server isolates the web browser from RSS protocols.

12. The apparatus of claim 7 wherein the tearoff object has characteristics independent of the web browser.

13. A non-transitory computer-readable medium storing instructions that, when executed by one or more processors, configure the one or more processors to perform a method for providing persistent access to a data feed listing in a web page, the method comprising:

displaying, on a user device, a window of a web browser;

displaying, in the window of the web browser, a list linking to one or more feed-enabled pages;

receiving, via the user device, input specifying a user operation associated with at least one of the one or more feed-enabled pages;

providing, to at least one server, data associated with the user operation;

caching, by the at least one server, the data associated with the user operation;

analyzing, by the at least one server, the data associated with the user operation for URL information;

matching, by the at least one server, the URL information with taxonomy path data in a database; and in response to the user operation associated with at least one of the one or more feed-enabled pages, displaying a tearoff object configured to automatically provide updated feed information in a persistent window separate from the window of the web browser.

14. The non-transitory computer-readable medium of claim 13 wherein the user operation associated with at least one of the one or more feed-enabled pages is a dragging of a representation of the at least one of the one or more feed enabled pages.

15. The non-transitory computer-readable medium of claim 13 wherein the method further comprises:

embedding the tearoff object in a document distinct from the web page.

16. The non-transitory computer-readable medium of claim 13 wherein the method further comprises:

displaying the tearoff object in the form of a ticker-style display.

17. The non-transitory computer-readable medium of claim 13 wherein the at least one server isolates the web browser from RSS protocols.

18. The non-transitory computer-readable medium of claim 13 wherein the tearoff object has characteristics independent of the web browser.

* * * * *